United States Patent [19]

Chandler

[11] Patent Number: 4,479,346
[45] Date of Patent: Oct. 30, 1984

[54] AUTOMATIC ELECTRICAL BED KNIFE ADJUSTER

[76] Inventor: Noel Chandler, 114 Venus St., Jupiter, Fla. 33458

[21] Appl. No.: 249,435

[22] Filed: Mar. 31, 1981

[51] Int. Cl.³ .................. A01D 55/22; A01D 75/08
[52] U.S. Cl. ................................ 56/250; 56/10.2; 83/72; 241/37
[58] Field of Search ............... 56/10.2, 249, 249.5, 56/250, 251–254, 12.1, DIG. 15, DIG. 17; 241/37, 241; 83/349, 72

[56] References Cited

U.S. PATENT DOCUMENTS

| | | | |
|---|---|---|---|
| 2,782,853 | 2/1957 | Heffelfinger | 83/72 |
| 2,990,741 | 6/1961 | Hasse et al. | 83/72 |
| 4,084,752 | 4/1978 | Hagiwara et al. | 241/37 |
| 4,198,006 | 4/1980 | Rolfe | 241/37 |
| 4,205,797 | 6/1980 | Bennett et al. | 241/37 |
| 4,335,569 | 6/1982 | Keeney et al. | 56/10.2 |

Primary Examiner—Gene Mancene
Assistant Examiner—John G. Weiss
Attorney, Agent, or Firm—Barry L. Haley

[57] ABSTRACT

An electrically operated automatic adjustment system for a reel blade lawn mower to provide the proper contact pressure and cutting clearance between the reel blade and the bedknife at all times. An electrical signal is generated across the bedknife and reel blade that functionally represents the contact pressure. One or more measurable parameters of the signal define an optimum contact pressure. A control circuit uses signal values to continuous monitor and drive (if necessary) a motor or other control device connected to either the bedknife or the reel blade to maintain the optimum spatial relationship between the bedknife and the reel blade for optimum cutting.

7 Claims, 9 Drawing Figures

AUTOMATIC ELECTRICAL BED KNIFE ADJUSTER

BACKGROUND OF THE INVENTION

This invention relates generally to an automatic adjustment system for providing the proper relationship spatially between the reel blade and the bedknife of a lawn mower for optimum cutting, and specifically to an electrical bedknife adjustment system that measures characteristics of the electrical circuit such as voltage, current or the like as a function of the spatial relationship and contact pressure between the reel blade and the bedknife.

Reel blade lawn mowers are used commercially for mowing large areas such as golf courses and the like. The reel blade mowers are usually ganged together to form a plurality of cutting devices which are propelled by a vehicle. One problem faced by the mower operator is the necessity for constantly adjusting the bedknife on each reel blade mower. Proper adjustment for most such mowers requires establishing a light touch between the bedknife and the reel blade.

Conventional reel blade mowers have been and continue to be adjusted mechanically using bolts, set screws and spring mechanisms. The major drawback of the conventional mechanical system is that proper adjustment is short lived due to the vibrations of the mower and the often bumpy operational environment. In using a gang of mowers, the operator must adjust each mower unit individually, an extremely time consuming operation. Another problem with the proper adjustment of a reel blade mower is that many times the mower operator is not proficient to provide the proper adjustment. Improper operator adjustment can result in premature blade wear and poor cutting characteristics.

The present invention overcomes all the above problems by providing an automatic self-adjusting system that continuously monitors and adjusts, if necessary, the reel blade position relative to the bedknife for the optimum cutting position while the mower is in operation. Once the system is turned on, the operator need not concern himself with the adjustment of the mower blade and bedknife, which is being accomplished while the mower is cutting. The system is especially useful and compatible with systems using gangs of mowers such that each mower is automatically kept in adjustment.

SUMMARY OF THE INVENTION

An electrical system for automatically monitoring and adjusting the bedknife position relative to the reel blade edge in a reel blade mower to continuously ensure that the proper contact pressure and spatial relationship is maintained for optimum cutting.

The system includes a reel blade/bedknife position monitoring circuit which is electrically coupled across the reel blade (or frame conductive thereto) and to the bedknife. Applicant has determined that such a circuit develops a current across the bedknife and reel blade having measurable electrical characteristics that are a function of the contact pressure and spatial relationship between the bedknife cutting edge and the blade cutting edge during rotation of the reel blade. The monitoring circuit includes a detecting device for sensing the selected characteristic, and a comparison circuit for comparing variations in the characteristic selected over a predetermined operating range, the resultant signal being useful for driving a control motor.

The monitoring circuit output is coupled to a motor control circuit that is connected to a motor that is mechanically linked to the bedknife. The signals received by the motor can be such to drive the motor (and therefore the linkage) in either direction, causing the bedknife to either move toward or away from the reel blade depending upon on the signal received by the motor.

When the bedknife is located at its optimum position relative to the reel blade surface, the control circuit will send no signals to the motor.

In one embodiment the monitoring circuit can use the voltage level developed between the reel blade and the bedknife. This is accomplished by having an electrical power source such as a battery that has one side connected electrically to the reel blade. This is done by connecting one terminal lead to the metal mower frame (which itself is electrically conductive through the reel blade). The bed knife is electrically insulated from the frame and receives the other battery terminal lead, establishing an electrical potential between the bedknife and the reel blade. The current flow (and voltage across the bedknife edge and reel blade) is measurable when the reel blade is rotating relative to the bedknife, preferably at its normal operational rotational cutting rate. The values obtained vary as a function of the reel blade/bedknife contact pressure.

The system circuit includes a signal amplifier and comparators to establish and compare the voltage range anticipated depending upon different situations that could exist between the relative position of the reel blade and the bedknife, so that the output signal from the monitor circuit to the motor control circuit will establish proper direction of motor activity, if required. If the voltage across the reel blade and bedknife is within a desirable predetermined range, then no control signal will be presented to the motor, indicating that the bedknife is at a proper adjustment. Additional circuitry can provide for high moisture conditions or emergency shut down.

It is an object of this invention to provide an automatic self-adjusting bedknife for a reel blade type lawn mower.

It is another object of this invention to provide an electrical bedknife adjuster that continuously adjusts the bedknife while the mower is being operated.

And yet still another object of this invention is to provide an automatic bedknife adjuster that continuously monitors the contact pressure between the bedknife and the reel blade and if the contact pressure is not a desired value can provide a signal to change the relationship between the bedknife and the reel blade.

But yet still another object of this invention is to provide a system that develops a signal electrically between the bedknife and the reel blade, the signal producing one or more signal values that is functionally related to the contact pressure and spatial relationship between the bedknife and the reel blade, useful for providing optimum continuous adjustment of the mower.

In accordance with these and other objects which will be apparent hereinafter, the instant invention will now be described with particular reference to the accompanying drawings.

PREFERRED EMBODIMENT OF THE INVENTION

Figure 1:
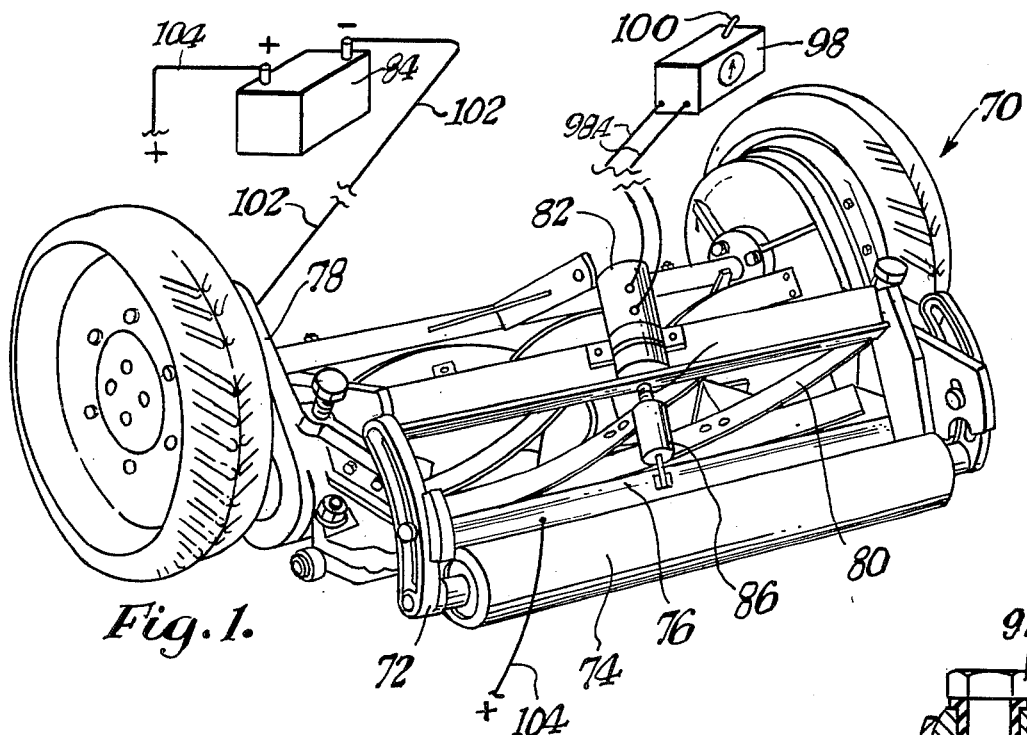
FIG. 1 shows a perspective view of a reel blade lawn mower in accordance with the present invention.

Referring now to FIG. 1, the present invention is shown generally at 70 including a conventional reel blade mower frame 78 having a bedknife 76 and roller 74 attached thereto. The operation of the mower itself other than the bedknife adjustment is conventional. The bedknife 76 is attached by linkage 86 to a two directional D.C. electric motor 82 mounted on top of the frame. Rotation of the motor shaft 90 causes the bedknife 76 to move either toward or away from reel blade 80 of the mower, depending on the direction of rotation. The motor 82 is connected to a control box 98 having a switch 100 and additional circuitry which is explained below.

In one embodiment a battery 84 supplies DC current to the lead 102 which terminates on electrically conductive metal frame 78 and to lead 104 which is electrically connected to the bedknife 76. The control box 98 and its associated circuitry also has two input leads 98A connected across the conductive frame 78 and the bedknife 76 respectively.

Figures 2, 3, 4:
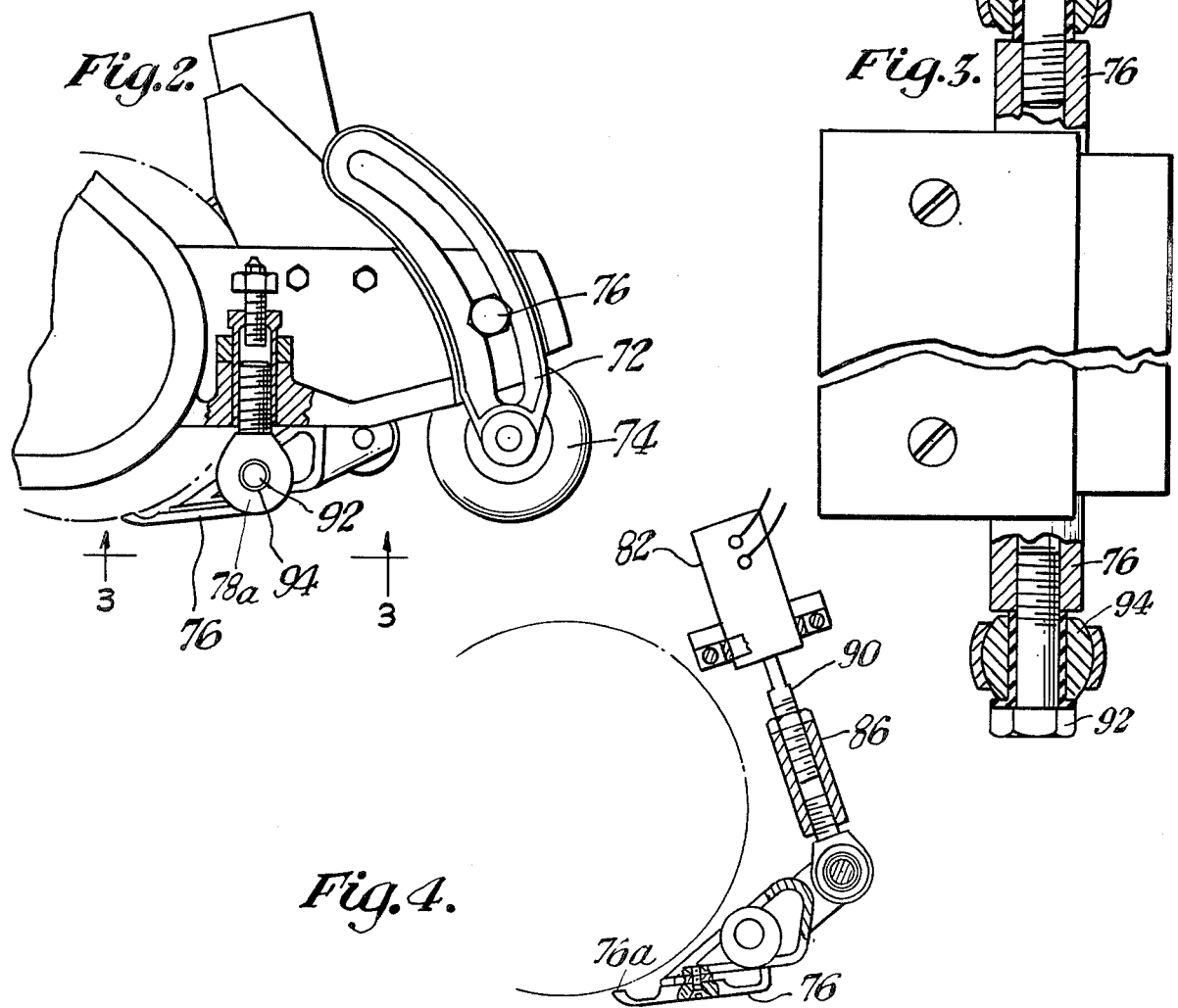
FIG. 2 shows a side elevational view of the present invention attached to a reel blade lawn mower.
FIG. 3 shows a top elevational view partially in crossection showing the attachment of the bedknife to the frame and the insulation electrically thereof.
FIG. 4 shows a schematic diagram in a side elevational view of the operation of the present invention.

FIGS. 2 and 3 show that the bedknife 76 is electrically insulated from the frame 78 by the use of suitable rubber insulators 94 which also are used as dampeners in the bolt connections 92 between the bedknife 76 and the frame connector 78a. Thus with the battery 84 connected as shown, an electrical potential is established between the reel blade 80 and the bedknife 76.

FIG. 4 shows the motor 82 and a threaded linkage 86 that includes shaft 88 from the motor and threaded fastener 88 connected to the pivoting bedknife. Rotation of the motor shaft 90 causes the linkage 86 to move longitudinally causing pivotal motion of the bedknife 76 and particularly the bedknife contact edge 76a to move toward or away from the reel blade, dependent upon the direction of rotation of shaft 90. Appropriate signals from the control circuitry 98 to the motor can effectively position the bedknife edge 76a relative to the reel blade. Control of the motor is discussed in greater detail below.

Figure 5:
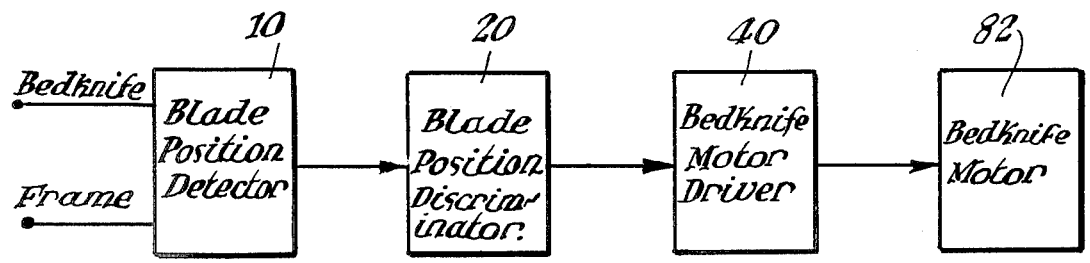
FIG. 5 shows a block diagram of the control circuit of the present invention.

Referring now to FIG. 5, a block diagram of the bedknife motor control circuit is illustrated. The circuit comprises a blade position detector 10, a blade position discriminator 20 and a bedknife position motor driver 40 to drive the bedknife motor 82. Thus, whenever the reel blades are rotating, the blade position detector 10 is constantly monitoring the position of the reel blades relative to the bedknife. If the reel blade pressure on the bedknife becomes excessive, the blade position discriminator 20 will signal the bedknife motor driver 40 to drive the motor 82 in a direction to release the excess pressure. However, if the reel blade pressure on the bedknife becomes insufficient, the blade position discriminator 20 will signal the bedknife motor driver 40 to drive the motor 82 in a direction to increase the bedknife pressure on the reel blades.

Figure 6:
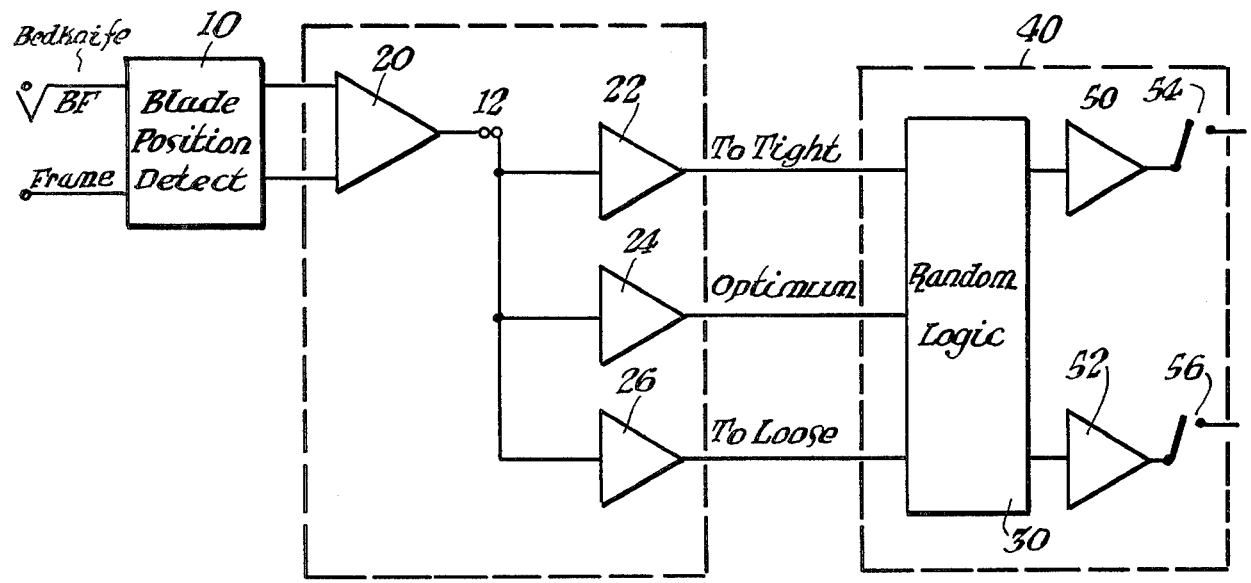
FIG. 6 shows a circuit diagram of a portion of the control circuit of the present invention.

Referring now to FIG. 6, a more detailed block diagram of the bedknife motor control circuit is illustrated. The blade position detector 10 is connected across the reel blades and the bedknife (shown previously) to monitor the voltage VBF. The operational amplifier stage 20 has its inputs electrically coupled to the blade position detector 10 in order to discriminate between varying signal characteristics from the blade position detector 10 whenever it is switched on. The output I of the operational amplifier stage 20 is connected to respective inputs of the comparators 22, 24 and 26, each of which have their outputs connected to respective inputs of the random logic circuit 30. Random logic circuit 30 has its first output connected to a first relay driver 50 which in turn is connected to the relay 54 which is normally open and connected to a first input of motor 82. The second output of the random logic circuit 30 is connected to a second relay driver 52 which is electrically connected to relay 56 also normally open which is connected to a second input of the motor 82. The operation of the circuit is explained in more detail below. Thus, the bedknife can be adjusted relative to the reel blades whenever signal deviations from a predetermined condition exist at the input of the blade position detector 10. The direction of the adjustment depends on which input of the motor 82 is energized, as the direction of rotation of the motor can be either clockwise or counterclockwise.

Figure 7:
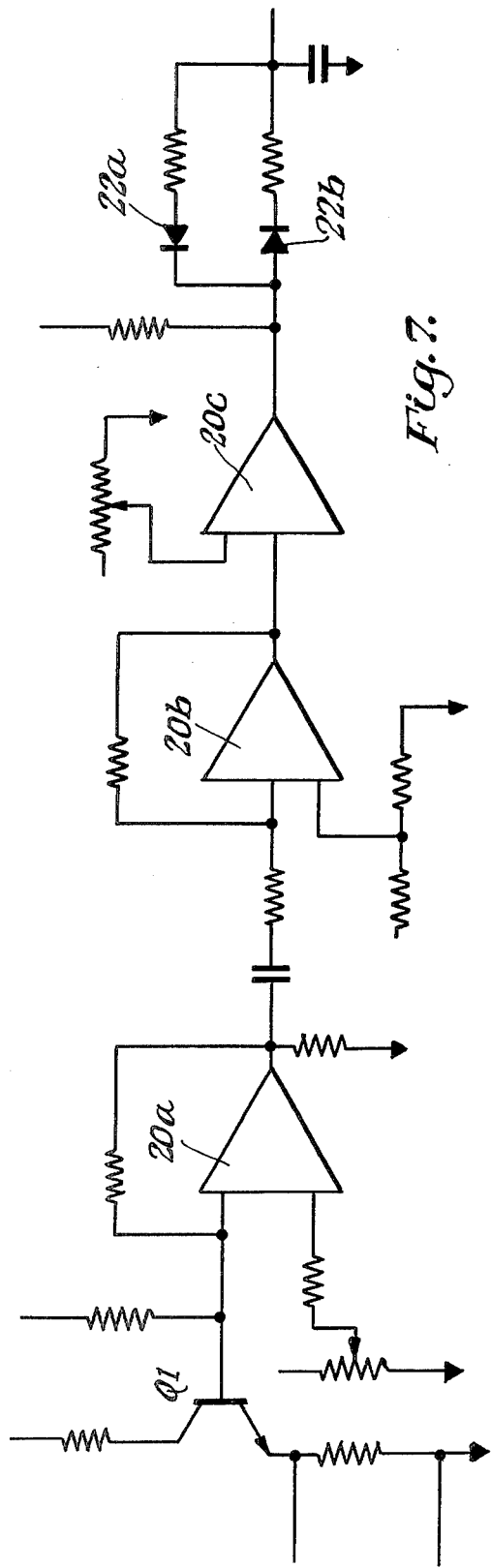
FIG. 7 shows a schematic diagram of a portion of the control circuit of the present invention.

Referring now to FIG. 7 a portion of the electrical motor control circuit is shown. The circuit comprises an input transistor Q1 having a 10 OHM resistor across the bedknife and the reel blades connected to the emitter. Therefore, the base voltage signal is variable depending on the contact pressure of the reel blades on the bedknife. The base voltage signal wave form of Q1 closely resembles the signal caused by contact bounce when closing a switch. The base voltage signal is then amplified by the serially connected operational amplifiers 20a and 20b having the component values as shown in FIG. 7. After amplification and AC coupling is accomplished by the amplifiers 20a and 20b and 20c, the signal passes through the diode 22b and respective comparator 680 OHMs resistor charging the 4.7 microfared capacitor which provides a better defined signal to the inputs of comparators 24, 26 and 28. The capacitor is discharged through the diode 22a and back through the amplifier 22a to ground.

Figure 8:
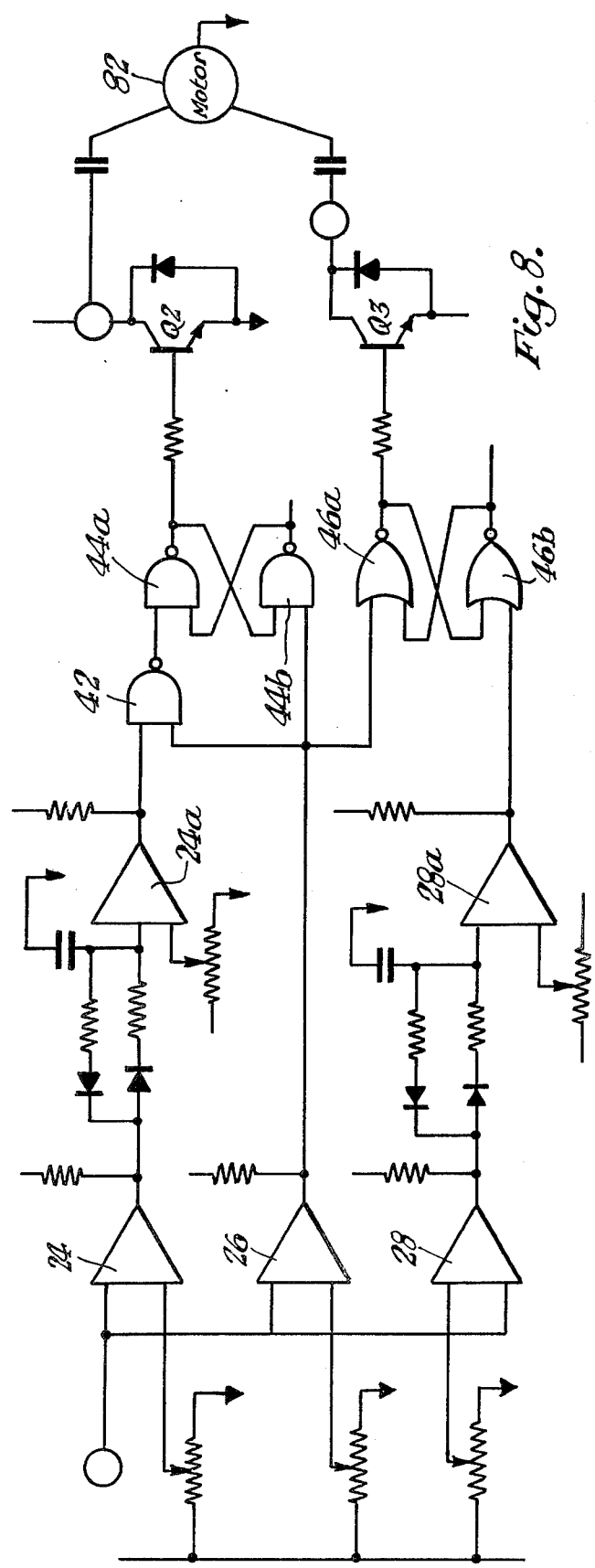
FIG. 8 shows an alternate circuit diagram useful with the present invention.

Referring to FIG. 8, the comparator 24 has its input 7 connected to the node 1, while its input 6 is connected through the variable 10K OHM resistor to the 5 volt power source and its output 1 connected to the delayed input 5 of the amplifier 24a, which has its input 4 connected through the variable 10K resistor to the 5 volt power source. The output 2 of amplifier 24a is connected to the input 1 of gate 42. The diode and capacitor configuration connected to input 5 delays the output signal from amplifier 24 to present unnecessary motor operation when the bedknife bounces or momentarily changes position.

The comparator 26 has its input 9 connected to the output 2, its input 8 connected through a 10K variable resistor to the 5 volt power supply and its output 14 connected to the input 2, 10 and 5 of the respective gates 42, 44b and 46a.

The output 3 of the gate 42 is connected to the input 4 of gate 44a which is cross-coupled to the gate 44b; the output 6 of gate 44a being connected through the 1K OHM resistor to the base of the transistor Q2.

The gate 46a is also cross-coupled to the gate 46b and the gate 46a has its output 4 connected through a 1K OHM resistor to the base of the transistor Q3.

The comparator 28 has its input 10, connected to the output 2, its input 11 connected through a 10K OHM variable resistor to the 5 volt power supply and its output 13 connected to the delayed input 7 of the comparator 28a. The input 6 of comparator 28a is connected through a 10K OHM variable resistor to the 5 volt power source. The output 1 of comparator 28a is connected to input 9 of the gate 46b. The capacitor and diode configuration on input 7 of diode 28a delays the signal from the output of the amplifier 28 in order to prevent unnecessary motor operation caused by bedknife bounce or other momentary disturbances.

In operation, the control circuit works as follows:

When the bedknife position is correct, the base voltage of transistor Q1 is amplified and directed to node 1 where it is analyzed by the comparators 24, 26 and 28. Since the signal reflects a correct blade position, the comparator 26 provides a signal to the inputs 2, 10 and 5 of the respective gates 42, 44b and 46a which maintains the gates in an "off" condition. Therefore neither transistor 50 or 52 would be energized to drive the motor to adjust the blade.

However, if the base voltage of the transistor Q1 reflects a signal at node 1 that the blade position is too tight against the bedknife, the comparator 24 and 24a would generate a signal at input 1 of gate 42 which causes a change in the signal level at output 3 of gate 42. The change in signal level to input 4 of gate 44a causes the cross-coupled gates 44a and 44b to turn "on" and produce a signal to the base of the transistor Q2, switching the transistor on, closing the relay K1 and energizing the motor 82 to operate in a forward direction. The motor 82 continues to run until the base voltage of the transistor Q1 reflects a correct blade position, driving the amplifier 26 to produce a signal at input 2 of gate 42 and input 10 of gate 44b which turns the transistor Q2 off de-energizing the motor 82.

On the other hand, if the contact pressure of the reel blade on the bedknife is insufficient, the base voltage of the transistor Q1 will reflect a signal that when amplified produces a signal at output 2 which drives the comparator 28 and 28a, generating a signal level at input 9 and turning the cross-coupled gates 46a and 46b to an "on" condition. The signal at output 4 of gate 46a is directed to the base of the transistor Q3 driving the transistor to an "on" condition. The transistor Q3 closes the relay K2 which drives the motor 82 in the reverse direction of when the motor is driven by the transistor 50, moving the bedknife closer to the reel blades. The motor 82 continues to run until the base voltage of the transistor Q1 reflects a correct blade position, driving the amplifier 26 to produce a signal at input 5 of gate 46a which turns the transistor Q3 off de-energizing the motor 82.

The control circuit may also include an additional operational amplifier (not shown) which is designed to prevent operation of the circuit whenever the reel blades are not rotating. The amplifier simply provides an output which keeps the gate circuits in an off position whenever the base voltage of the transistor Q1 reflects no movement of the reel blades. In the alternative, a simple switch could be used which de-energizes the control circuit whenever the reel blades are not rotating.

TABLE OF COMPONENTS

| Drawing Number | Component | Value or Model | Pin Assignment To +5 | To 6 NO |
|---|---|---|---|---|
| 20a, 20b | Operational Amplifier | LM 324 | 4 | 11 |
| 20c, 24, 26, 28 | Comparator | LM 339 | 3 | 12 |
| 24a, 28a | Comparator | LM 339 | 3 | 12 |
| 42 | Gate | SN 74LSOON | 14 | 7 |
| 44a | Gate | SN 74LSOON | 14 | 7 |
| 44b | Gate | SN 74LSOON | 14 | 7 |
| 46a | Gate | SN 74LSO2N | 14 | 7 |
| 46b | Gate | SN 74LSO2N | 14 | 7 |
| Q1 | Transistor | 2N3904 | | |
| Q2 | Transistor | 2N2222A | | |
| Q3 | Relay | 2N2222A | | |

All diodes are 1N914 unless specified; all capacitors are in microfarads, and all resistors are ⅛ watt.

Figure 9:
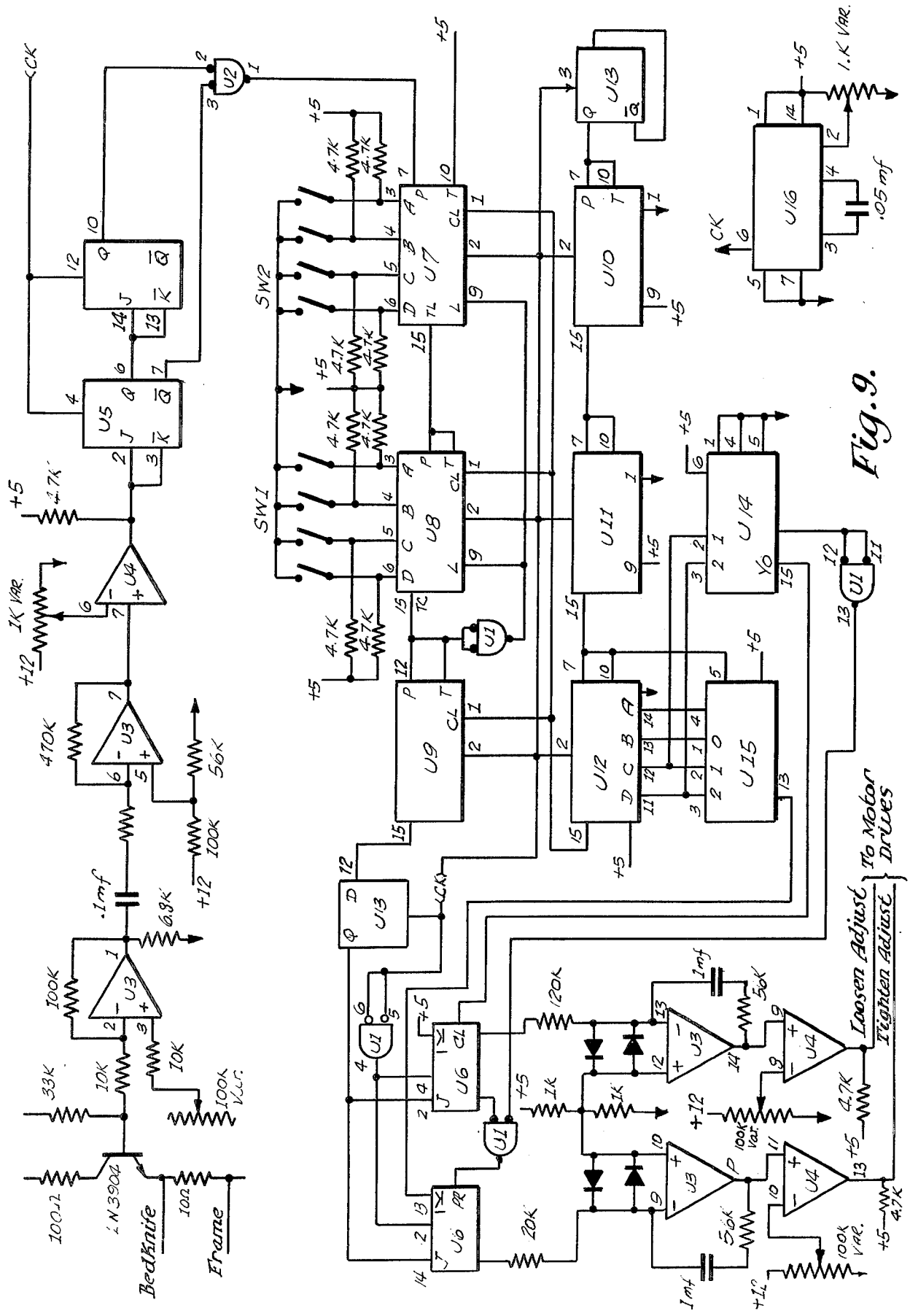
FIG. 9 shows a digital circuit that could alternatively be employed with the present invention.

Referring to FIG. 9 a digital circuit can also be used to maintain the bedknife in proper adjustment. Generally the signal from the Q1 transistor is amplified and passed through an AC coupling amplifier in the same manner as described previously in FIG. 7. However, the values of the amplifiers have been somewhat changed so that the output from pin 1 of the amplifier U4 represents pulses of varying duration either just below the 12 volts supplied level or just above the 0 voltage level. The output from pin 1 of the amplifier U4 is directed to the pin 2 of the dual J.K Positive triggered flip flop such as a 54 LS 109 or any other compatible component. The flip flop circuit has its pins 4 and 12 connected to pin 6 of the clock U16 such as an MC3805 or any other compatible component. In this embodiment the clock is set to pulse the flip flop circuit every one microsecond. The outputs from pin 7 and 10 of the flip flop circuit are connected to pins 2 and 3 of the quadruple 2-input positive nor gate such as a 74 LS02 or any other compatable component. The output of pin 1 of the gate is connected to pin 7 of the programmable counter circuit comprised of counters U7, U8 and U9 in the cascade decade rate multipliers U10, U11 and U12. Each of the counters U7, U8 and U9 and the decade rate multipliers U10, U11 and U12 are connected to the bistable latches U13. The respective outputs of the decoders U14 and U15 are connected to the respective pins 1 and 11 of the dual J.K. positive triggered flip flop U6.

Flip flop U6 has one output connected through an amplifier circuit which drives the bedknife motor to tighten adjustment and another output connected through a similar amplifier circuit to drive the bedknife motor to loosen the adjustment.

In operation, the programmable counters U7 and U8 are set to make 8,000 counts in a 5 second time period. A nominal reference count of four fifths of the 8,000 count is used to compare the count of each leading edge of the actual signals being generated between the bedknife and reel blades with the clock count so that if between two seconds and four seconds the actual pulse rate is faster than the reference pulse rate, the rate of change of pulse needed for the actual signal pulse rate to be equal to the reference pulse rate after 4 seconds should be known. This rate, if changed, is represented as the shape of a voltage curve generated by the integrator. Therefore, the time the motor is actuated for changing the contact pressure of the reel blade is determined by the time the voltage curve is above a predetermined threshhold voltage value of a comparator. In the present case the motor begins running in a period of time slightly before the 4 second reference time and continues to run past the reference time if the compare signal exceeds the threshhold value. On the other hand, if the actual signal count is behind the reference signal count after 4 seconds, similarly the rate must be increased so that the actual pulse rate is corrected close to the fifth second. If the integrator curve increases and exceeds the threshhold value, than the motor will turn in the other direction for the duration of time the curve is above the threshhold value. Therefore, if the pressure contact gets too tight the signal from the flip flop U6 will drive the loosen adjustment amplifier circuit for the duration of time previously explained which in turn drives the bedknife position motor. If the pulse is too slow than the other output of the flip flop U6 will be energized which is connected to the second amplifier circuit to tighten the bedknife against the reel blades as shown.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. An automatic electrical bedknife adjuster for a reel blade mower, said mower including a frame, a reel blade mounted on said frame, and a bedknife, comprising:
   an electrical power source;
   means connected to said bedknife for moving said bedknife relative to said reel blade;
   means for generating an electrical signal representative of the contact pressure between said reel blade and said bedknife; and
   means for controlling said means for moving said bedknife relative to said reel blade as a function of the contact pressure between said reel blade and said bedknife to establish optimum contact pressure for cutting.

2. An automatic electrical bedknife adjuster for a reel blade mower, comprising:
   a frame;
   an electrical power source;
   a reel blade connected to said frame;
   a bedknife connected to said frame;
   an electrically actuated means for moving said bedknife relative to said reel blade connected to said power source; and
   means for generating an electrical signal across said bedknife and said reel blade representative of the contact pressure existing between said bedknife and said reel blade; and
   control means connected between said electrically actuated bedknife moving means and said signal generating means for controlling said bedknife moving means as a function of said signal generated representative of the contact pressure whereby the optimum contact pressure between said bedknife and said reel blade are continuously maintained.

3. An automatic electrical bedknife adjuster for a reel blade mower, said mower including a frame, an electrically conductive reel blade mounted to said frame, and an electrically conductive bedknife insulated from but connected to said frame, the adjuster comprising:
   an electrical power source;
   a bedknife driving means, operably connected to said mower for positioning said bedknife spatially relative to said reel blade, and electrically coupled to said power source;
   circuit means for sensing and controlling the contact pressure in said reel blade and said bedknife, said circuit means electrically coupled to said power source, said reel blade, and said driving means, whereby the system will continuously maintain a predetermined contact pressure between said reel blade and said bedknife representative of the optimum spatial relationship between said reel blade and said bedknife for optimum cutting.

4. An automatic electrical bedknife as set forth in claim 3, wherein said circuit means, comprising:
   a sensing means for sensing the contact pressure of said reel blades on said bedknife and generating a signal corresponding to said contact pressure electrically coupled to said power source;
   a discriminator means for generating an output representative of said contact pressure, electrically coupled to said sensing means;
   a control means for energizing and de-energizing said electric driving means, electrically coupled to said discriminator means and said driving means.

5. An automatic electrical bedknife as set forth in claim 4, wherein:
   said sensing means including a first transistor having an input operably coupled to said bedknife sand said reel blades and a transistor output generating a signal, a first amplifier circuit for amplifying and AC coupling said signal, said first amplifier having a first amplifier input and a second amplifier output,
   said amplifier input electrically coupled to said transistor output;
   said discriminator means including a second amplifier circuit for detecting an excessive contact pressure signal, a third amplifier circuit for detecting a correct contact pressure signal, and a fourth amplifier circuit for detecting an insufficient contact pressure signal, said second, third and fourth amplifier having a respective input electrically coupled to said first amplifier output and a respective second amplifier output, third amplifier output and fourth amplifier output, and a logic circuit having a first logic input electrically coupled to said second amplifier output, a second logic input electrically coupled to said third amplifier output, a third logic input electrically coupled to said fourth amplifier output, a first logic output and a second logic output;
   said control means including a second transistor circuit having a second transistor input and a second transistor output, a third transistor circuit having a third transistor input and a third transistor output, a first control relay having a first control input electrically coupled to said second transistor output and a first control output electrically coupled to said electric driving means, and a second control relay having a second control input electrically coupled to said third transistor output and a second control output electrically coupled to said electric driving means, said second transistor input electrically coupled to said first logic output and said third transistor input electrically coupled to said second logic output.

6. The method of automatically, electrically adjusting the contact pressure between the bedknife and the reel blades of a reel blade lawn mower to obtain the optimum contact pressure between the bedknife and the reel blades for optimum cutting comprising the steps of:
   (a) providing an electrical signal between the bedknife and the reel blade in a reel blade lawn mower;
   (b) sensing said electrical signal representative of the contact pressure existing between the bedknife and the reel blade; and
   (c) providing an actuating means for moving the reel blade relative to the bedknife to either increase or decrease the contact pressure in order to obtain and maintain the desired predetermined contact pressure as a function of the electrical signal sensed across the bedknife and the reel blade whereby the reel blade and the bedknife will be maintained at a predetermined desired contact pressure to ensure optimum cutting.

7. An automatic electrical bedknife adjuster as in claim 2, including:
   means connected to said frame for electrically insulating said bedknife from said reel blade, said reel blade and said bedknife being made of an electrically conductive material.

* * * * *